United States Patent
Bianchi

(10) Patent No.: US 10,273,807 B2
(45) Date of Patent: Apr. 30, 2019

(54) FLUIDFOIL FENCE

(71) Applicant: ROLLS-ROYCE PLC, London (GB)

(72) Inventor: Stefano Bianchi, Derby (GB)

(73) Assignee: ROLLS-ROYCE PLC, London (GB)

( * ) Notice: Subject to any disclaimer, the term of this patent is extended or adjusted under 35 U.S.C. 154(b) by 340 days.

(21) Appl. No.: 14/630,142

(22) Filed: Feb. 24, 2015

(65) Prior Publication Data

US 2015/0267539 A1    Sep. 24, 2015

(30) Foreign Application Priority Data

Mar. 19, 2014 (GB) .................................. 1404938.1

(51) Int. Cl.
| | |
|---|---|
| *F01D 5/14* | (2006.01) |
| *B64C 11/18* | (2006.01) |
| *F04D 29/38* | (2006.01) |
| *F04D 29/66* | (2006.01) |

(Continued)

(52) U.S. Cl.
CPC .............. *F01D 5/141* (2013.01); *B64C 11/18* (2013.01); *F02C 3/36* (2013.01); *F04D 29/384* (2013.01); *F04D 29/667* (2013.01); *B64D 2027/005* (2013.01); *F05D 2220/32* (2013.01); *F05D 2240/301* (2013.01); *F05D 2250/62* (2013.01); *Y02T 50/66* (2013.01)

(58) Field of Classification Search
CPC ... F01D 5/141; F01D 5/12; F01D 5/14; F01D 5/148; B64C 11/18; B64C 3/10; B64C 11/16; B64C 27/46; B64C 27/467; B64C 3/14; B64D 2027/005; F02C 3/36; F04D 29/384; F04D 29/386; F04D 29/667; F05D 2220/32; F05D 2220/324; F05D 2220/325; F05D 2240/301; F05D 2250/62; Y02T 50/66

See application file for complete search history.

(56) References Cited

U.S. PATENT DOCUMENTS

| | | | |
|---|---|---|---|
| 4,664,593 | A | 5/1987 | Hayashi et al. |
| 4,671,473 | A | 6/1987 | Goodson |

(Continued)

FOREIGN PATENT DOCUMENTS

| | | |
|---|---|---|
| CN | 201574972 U | 9/2010 |
| CN | 103573703 A | 2/2014 |

(Continued)

OTHER PUBLICATIONS

Peters et al., "Rotor Interaction Noise in Counter-Rotating Propfan Propulsion Systems," Proceedings of ASME Turbo Expo 2010, 2010, pp. 1-14.

(Continued)

*Primary Examiner* — David E Sosnowski
*Assistant Examiner* — Sang K Kim
(74) *Attorney, Agent, or Firm* — Oliff PLC

(57) ABSTRACT

A fluidfoil comprises a main body and a fence, wherein the fence has different lean angles with respect to the main body at different chordwise positions, and wherein the fence is divided along its chordwise extent into at least two portions, where a first portion nearer a leading edge of the fence has a smaller lean angle than a second portion further from the leading edge, and wherein all portions are either anhedral or dihedral.

8 Claims, 4 Drawing Sheets

(51) Int. Cl.
*F02C 3/36* (2006.01)
*B64D 27/00* (2006.01)

(56) References Cited

U.S. PATENT DOCUMENTS

| | | | | |
|---|---|---|---|---|
| 4,674,709 | A * | 6/1987 | Welles | B64C 39/10 |
| | | | | 244/45 R |
| 5,031,313 | A * | 7/1991 | Blair | B23P 6/002 |
| | | | | 29/402.06 |
| 5,190,441 | A | 3/1993 | Murphy et al. | |
| 5,226,783 | A * | 7/1993 | Mita | F04D 29/384 |
| | | | | 416/223 R |
| 5,992,793 | A * | 11/1999 | Perry | B64C 27/463 |
| | | | | 244/17.11 |
| 6,802,695 | B2 * | 10/2004 | Haller | F01D 5/141 |
| | | | | 416/223 R |
| 6,994,523 | B2 * | 2/2006 | Eguchi | F04D 29/384 |
| | | | | 416/228 |
| 7,758,306 | B2 * | 7/2010 | Burton | F01D 5/141 |
| | | | | 415/199.5 |
| 8,177,496 | B2 * | 5/2012 | Wilson | F01D 5/141 |
| | | | | 415/181 |
| 8,684,698 | B2 * | 4/2014 | Breeze-Stringfellow | |
| | | | | F01D 5/141 |
| | | | | 416/223 A |
| 8,783,623 | B2 * | 7/2014 | Schaber | B64C 23/065 |
| | | | | 244/199.3 |
| 2012/0195739 | A1 * | 8/2012 | Kingan | B64C 7/02 |
| | | | | 415/119 |
| 2013/0045107 | A1 | 2/2013 | Topaz et al. | |
| 2014/0234112 | A1 * | 8/2014 | Read | B64C 11/18 |
| | | | | 416/223 R |
| 2018/0304997 | A1 * | 10/2018 | Dhandhania | B64C 23/069 |

FOREIGN PATENT DOCUMENTS

| | | | |
|---|---|---|---|
| DE | 202013101386 U1 | 7/2014 | |
| EP | 0 782 956 A1 | 7/1997 | |
| GB | 768026 A * | 2/1957 | F01D 5/141 |

OTHER PUBLICATIONS

Read et al., "Effect of a Winglet on Open Rotor Aerodynamics and Tip Vortex Interaction," American Institute of Aeronautics and Astronautics, 2013, pp. 1-24.

Valarezo, "On the Use of Proplets as a Means for Reducing Blade Compressibility Losses," American Institute of Aeronautics and Astronautics, 1989, pp. 452-457.

Sullivan et al., "The Effect of Proplets and Bi-Blades on the Performance and Noise of Propellers," Society of Automotive Engineers, Inc., 1981, pp. 1-8.

Oct. 30, 2014 Search Report issued in British Application No. GB1404938.1.

Jul. 27, 2015 Search Report in European Patent Application No. 15 15 6348.

* cited by examiner

FLUIDFOIL FENCE

BACKGROUND

The present disclosure concerns fluidfoils, gas turbine engines and methods of managing flow tip momentum transfer. More specifically the disclosure concerns, in part, particular fluidfoil fence arrangements. The disclosure may have particular utility when applied to some or all of the propeller blades of open rotor gas turbine engines having contra-rotating propeller stages, but this is not intended to be limiting.

It is known to provide the tips of fluidfoils with fences in the form of an aerodynamic fence at the end of the fluidfoil. The fence is leant at a particular lean angle, either towards the suction side of the fluidfoil (dihedral fence) or towards the pressure side of the fluidfoil (anhedral fence). Some fluidfoil tips may also have both an anhedral and a dihedral fence.

Fences increase efficiency by reducing fluid momentum in the radial direction as it passes the fluidfoil.

Fences also serve to reduce vortices at the fluidfoil tips. Vortices are inefficient and can be acoustically undesirable, especially where downstream structures intercept the vortices. A fence inhibits the flow of fluid from the pressure side of the fluidfoil (where the pressure is greater) to the suction side (where the pressure is lower). This tends to limit or prevent the creation of a spiralling trail of fluid (vortex) leaving the fluidfoil tip.

Where however momentum transfer from the pressure side to the suction side is insufficient in view of the presence of a fence, a vortex breakdown occurs and a bubble is formed. Vortex breakdown is an abrupt change of flow structure that occurs in swirling flows. If the fence causes sufficient reduction in momentum transfer, there may be a rapid deceleration of the flow in the axial direction in the vicinity of the fence. Further there may be a rapid expansion of the vortex core at approximately 50% of the tip chord, giving rise to a bubble like structure.

Although the breakdown causes the vortex to be weaker, it does not imply the decay of vorticity itself. The swirling is in fact redistributed over a larger area, potentially worsening the downstream wake. Vortex breakdown tends therefore to be even less desirable than a standard vortex from an acoustic viewpoint, particularly tending to increase broadband noise. Moreover, the overall direction of axial flow is usually reversed inside the bubble, thereby compromising, to some extent, aerodynamic performance.

Unless otherwise specified, the word axial is used throughout this specification to refer to the direction of the main rotational axis of a gas turbine engine to which fluidfoils would, in use, be attached. Similarly the word radial is used with respect to a gas turbine engine to which fluidfoils would, in use, be attached. Specifically radial refers to directions perpendicular to the main rotational axis of the gas turbine engine.

SUMMARY

According to a first aspect of the invention there is provided a fluidfoil comprising a main body and a fence, the fence having different lean angles with respect to the main body at different chordwise positions, and wherein a first portion of the fence, nearest a leading edge of the fence, has the same lean angle as a second portion of the fence immediately adjacent the first portion and wherein the second portion is shorter than the first portion.

Shortening the second portion is a convenient alternative to increasing its lean angle with respect to the first portion. Shortening a portion may have similar results to increasing its lean angle, as the impediment to flow from the pressure to the suction side of the fluidfoil will be correspondingly reduced.

The lean angle corresponds to the approximate angle that the fence or fence portion makes with a main body of the fluidfoil. More specifically the lean angle at a particular chordwise position may be defined as:

90° plus the angle subtended by:
i) a normal to the surface at a point on the surface towards which the fence portion leans, the point being at the tip of a main body of the fluidfoil and at the particular chordwise position, and
ii) a straight line between a tip of the fence at the particular chordwise position and the point defined in i).

A fence with lean angle variation from the front to the back of the fence (in the axial direction) may offer the potential for control of the flow tip momentum transfer between the pressure and suction sides of the fluidfoil. By deliberate design of the lean angle variation it may be possible to control the evolution of a leakage vortex, retaining it at the incipience of a breakdown event (i.e. low energy vortex). Such a fence may therefore give the efficiency benefits of a standard fence, without instigating a potentially detrimental vortex breakdown.

In some embodiments a third portion, further from the leading edge than the second portion, has a greater lean angle than that of the first and second portions. The third portion may therefore stabilise momentum transfer close to the breakdown point and prevent an increase in vortex energy from a trailing edge of the second portion.

In some embodiments the second and third portions are immediately adjacent.

The lean angle of any one portion is substantially consistent. This may facilitate easier manufacturing of the fluidfoil. It may also make the momentum transfer difference that will occur as a consequence of that portion more predictable.

In some embodiments there is a step-wise discontinuity between the second and third portions. This may be easier to manufacture than providing the portions with complimentary ramp regions to join them.

In some embodiments the second and third portions have complimentary ramp regions which meet to smoothly join those portions. This may reduce stress occurring between those portions.

Fence spanwise length variation may be of further assistance in managing the degree of impediment to momentum transfer and therefore vortex energy.

In some embodiments the fluidfoil is an open-rotor propeller blade. In other embodiments however the fluidfoil may for example be a blade or rotor blade, or specifically a ducted fan blade, a compressor blade, a turbine blade or a propeller blade.

According to a second aspect of the invention there is provided a gas turbine engine comprising one or more fluidfoils in accordance with the first aspect.

In some embodiments the gas turbine engine comprises contra-rotating forward and aft propeller stages, where the forward propeller is provided with at least one of the fluidfoils. The fluidfoil may be particularly advantageous when used in the forward propeller stage of a contra-rotating propeller system. The potential control exerted over the vortex produced by the forward propeller fluidfoils may mean that the impulsiveness with which the aft propeller intersects the vortex is decreased, with consequent acoustic benefits.

In some embodiments the gas turbine engine is an open rotor engine.

According to a third aspect of the invention there is provided a method of managing the flow tip momentum transfer from the pressure side to the suction side along the tip of a fluidfoil comprising use of a fluidfoil according to a first aspect of the invention.

A fourth aspect of the invention provides a fluidfoil comprising a main body and a fence, wherein the fence has different lean angles with respect to the main body at different chordwise positions, and wherein the fence is divided along its chordwise extent into at least two portions, where a first portion nearer a leading edge of the fence has a smaller lean angle than a second portion further from the leading edge, and wherein all portions are either anhedral or dihedral.

The skilled person will appreciate that a feature described in relation to any one of the above aspects of the invention may be applied mutatis mutandis to any other aspect of the invention.

DESCRIPTION OF THE DRAWINGS

Embodiments of the invention will now be described by way of example only, with reference to the Figures, in which.

DETAILED DESCRIPTION

Figure 1:
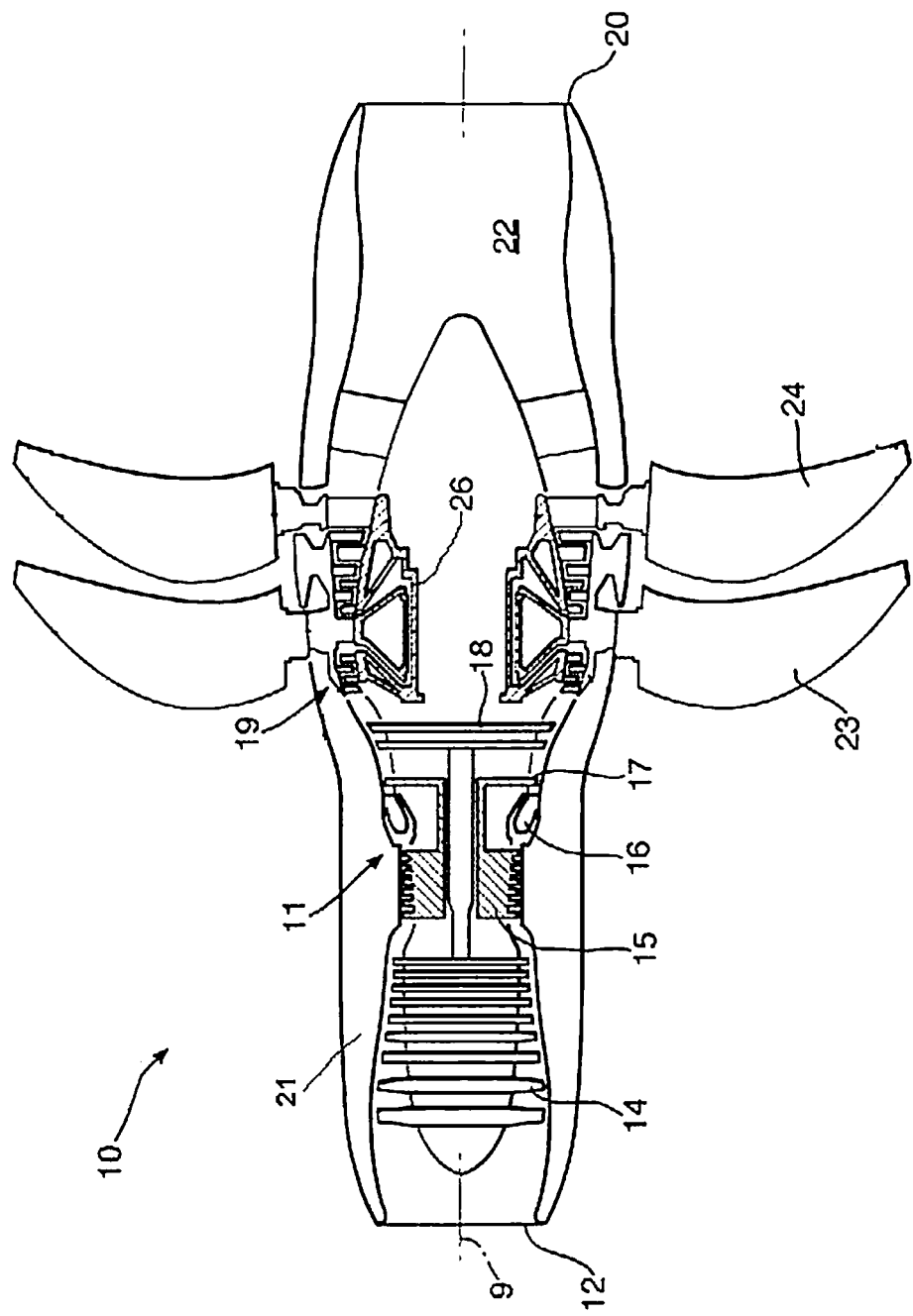
FIG. 1 is a sectional side view of a gas turbine engine having contra-rotating propeller stages.

Referring to FIG. 1, a twin-spooled, contra-rotating propeller gas turbine engine is generally indicated at 10 and has a principal rotational axis 9. The engine 10 comprises a core engine 11 having, in axial flow series, an air intake 12, an intermediate pressure compressor 14, a high-pressure compressor 15, combustion equipment 16, a high-pressure turbine 17, an intermediate pressure turbine 18, a free power (or low-pressure) turbine 19 and a core exhaust nozzle 20. A nacelle 21 generally surrounds the core engine 11 and defines the intake 12, nozzle 20 and a core exhaust duct 22. The engine 10 also comprises two contra-rotating propeller stages 23, 24 attached to and driven by the free power turbine 19 via shaft 26.

The gas turbine engine 10 works in a conventional manner so that air entering the intake 12 is accelerated and compressed by the intermediate pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, intermediate pressure and free power turbines 17, 18, 19 before being exhausted through the nozzle 20 to provide some propulsive thrust. The high-pressure, intermediate pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

Figure 2:
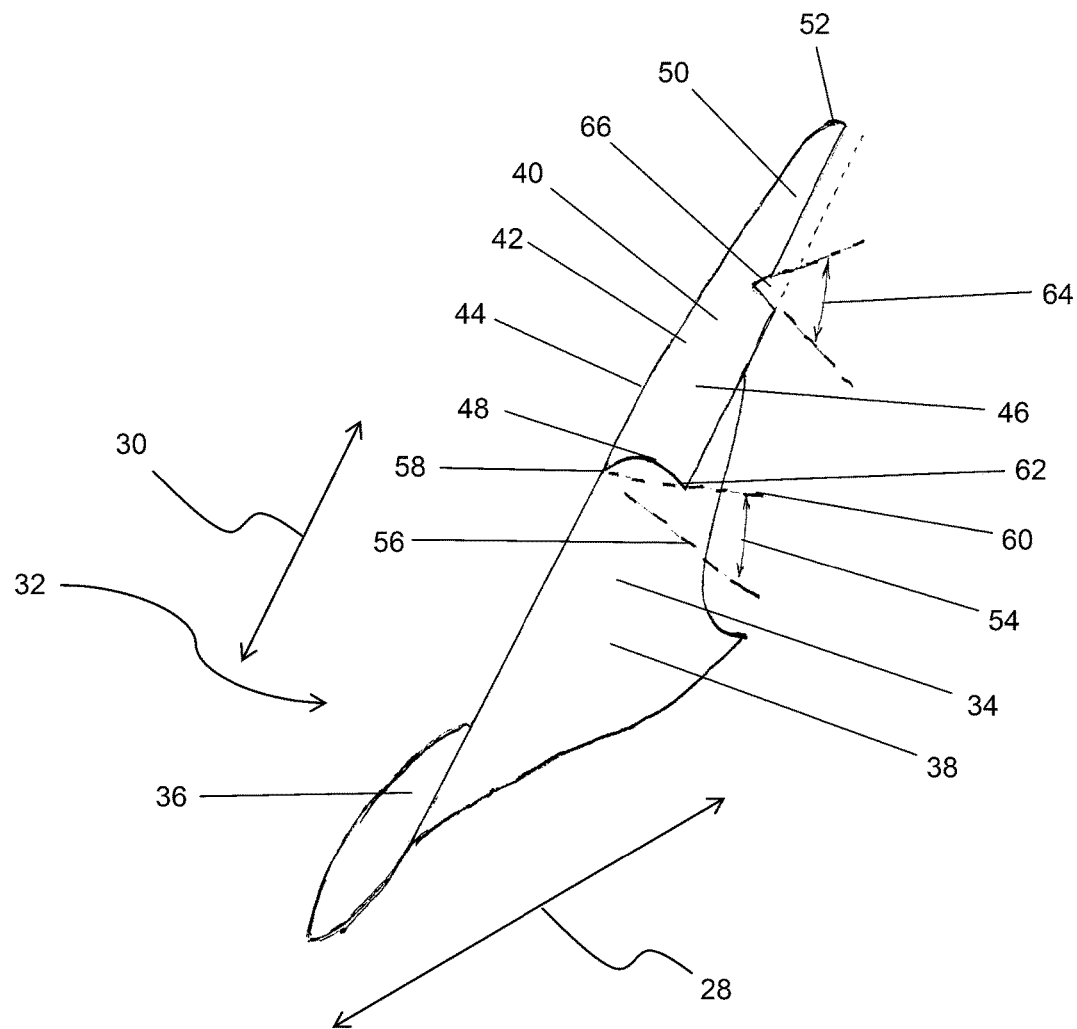
FIG. 2 is a perspective view of a fluidfoil according to an embodiment of the invention.
Figure 3:
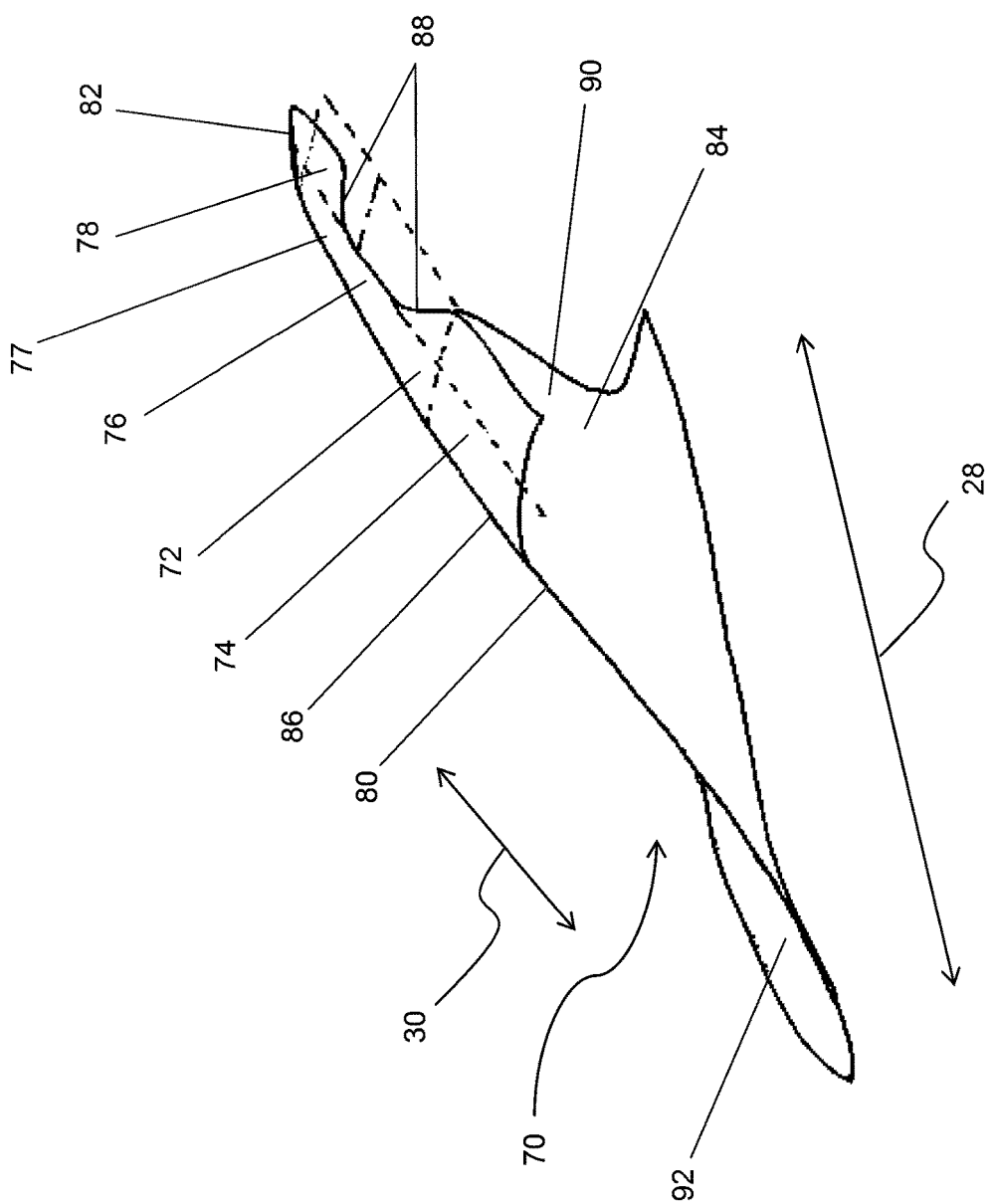
FIG. 3 is a perspective view of a fluidfoil according to an embodiment of the invention.
Figure 4:
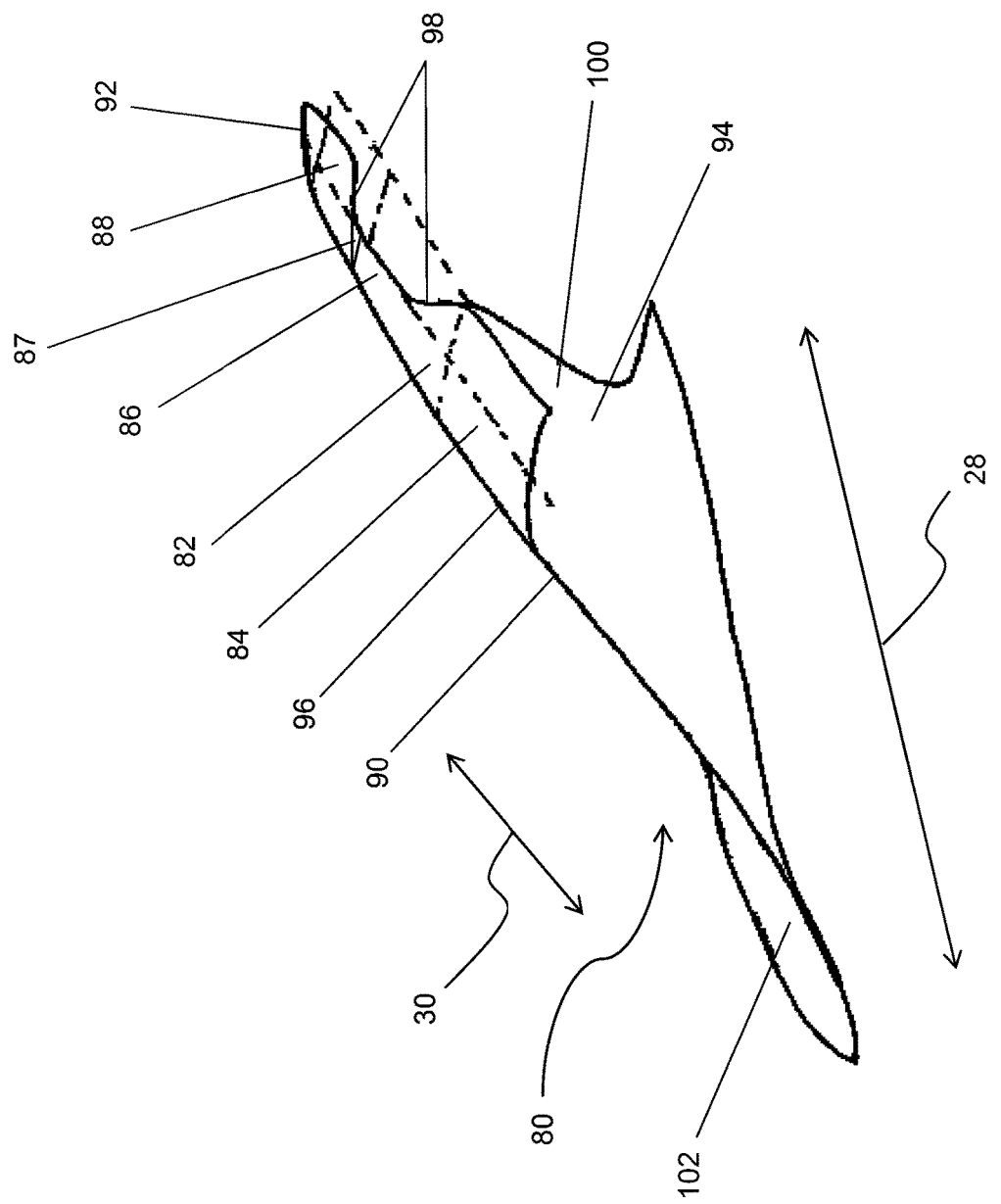
FIG. 4 is a perspective view of a fluidfoil according to another embodiment of the invention.

With reference to FIGS. 2 to 4 the following reference directions are consistently applied:

i) The axial direction 28 refers to a direction along the main rotational axis of a gas turbine engine to which the fluidfoil shown would be attached in use. The axial direction may therefore be thought of as extending between a leading and trailing edge of the fluidfoil in a line parallel to the main rotational axis of the gas turbine engine.

ii) The radial direction 30 refers and to a direction perpendicular to the main rotational axis of a gas turbine engine to which the fluidfoil shown would be attached in use. The radial direction 30 is substantially consistent with the spanwise direction of the flouidfoil shown.

iii) Upstream and downstream refer to the principal flow direction of fluid that would be normally present around the fluidfoil shown when in use.

Referring specifically now to FIG. 2, a fluidfoil, in this case an open-rotor propeller blade, is generally provided at 32. The blade 32 is suitable for use within the contra-rotating propeller stages 23, 24 of engine 10. As will be appreciated the features discussed with respect to FIG. 2 (and FIG. 3 below) could equally be applied to fluidfoils suitable for alternative purposes. Nonetheless fluidfoils such as blade 32 may be particularly advantageous when used as the blades of open-rotor gas turbine engines, especially when used in a forward propeller stage 23 of a pair of contra-rotating propeller stages.

Blade 32 has a pressure surface 34 and a suction surface 36. The blade 32 comprises a main body 38, a fence 40 and a blend region 42 disposed between the main body 38 and fence 40. The fence 40 is anhedral with respect to the main body 38, that is the fence 40 is leant towards the pressure surface 34 of the main body 38. As will be appreciated, in other embodiments the fence may be dihedral or have both anhedral and dihedral portions. The blend region 42 provides a curved transition between a tip 44 of the main body 38 and the fence 40, which is leant with respect to the main body 38. Both the blend region 42 and fence 40 retain the fluidfoil cross-section of the main body 38.

The blade 32 is divided into two portions, a first portion 46 nearest a leading edge 48 of the fence 40 and a second portion 50 immediately adjacent and downstream of the first portion 46 and extending to a trailing edge 52 of the fence 40. The first portion 46 and second portion 50 are immediately adjacent. The two portions 46, 50 have different lean angles. The lean angle of each portion 46, 50 corresponds to the approximate angle that the portion makes with the main body 38 of the blade 32.

More specifically the lean angle for the first portion 46 at the particular chordwise position corresponding to the leading edge 48 is:

90° plus an angle 54 subtended by:
i) a normal 56 to the pressure surface 34 at a point 58 on the pressure surface 34 at the tip 44 of the main body 38 of the fluidfoil 36 and at the particular chordwise position (in this case the leading edge 48), and
ii) a straight line 60 between a tip 62 of the first portion 46 at the particular chordwise position (in this case the leading edge 48) and the point 58 defined in i).

The lean angle for the second portion 50 at its upstream end (90° plus an angle 64) can be calculated in a similar way, taking account of the shift in the particular chordwise position.

Because the first portion 46 has a consistent lean angle throughout its extent, the lean angle calculated for the leading edge 48 chordwise position will also be applicable at all other chordwise positions throughout the chordwise extent of the first portion 46. This is also true for the second portion 50, albeit at a different consistent lean angle.

The lean angle of the first portion 46 is smaller than the lean angle of the second portion 50. The first portion 46 is therefore leant further towards pressure surface 34 than the second portion 50. Because the lean angle within each of the portions 46, 50 is consistent throughout that portion 46, 50, there is a step-wise discontinuity 66 at the transition between the two. In other embodiments however the portions 46, 50 could be provided with complimentary ramp regions which meet to smoothly join the portions 46, 50.

In the embodiment of FIG. 2, the blend region 42 has a radius of curvature of approximately 10% of the length of the chord of the main body 38 at its tip 44. The lean angle of the first portion 46 is approximately 100° and the lean angle of the second portion 50 is approximately 120°. In some embodiments the lean angle of the first portion falls between approximately 80° and 120° and the lean angle of the second portion falls between approximately 100° and 140°. In the embodiment of FIG. 2, the spanwise length of each blade portion 46, 50 is approximately 20% of the length of the chord of the main body 38 at its tip 44. In some embodiments the spanwise length of some or all of the blade portions fall between approximately 15% and 25% of the length of the chord of the main body 38 at its tip 44. In some embodiments a third portion (not shown) may be provided immediately downstream of the second portion. The third portion may also have a spanwise length between approximately 15% and 25% of the length of the chord of the main body 38 at its tip 44. Further the third portion may have a lean angle between approximately 80° and 120°.

When the blade 32 is rotating in use, air will flow around the blade 32 in the axial direction 28, relatively high pressure existing adjacent the pressure side 34 of the blade 32 and a relatively low pressure existing adjacent the suction side 36 of the blade 32. The pressure differential would therefore tend to cause a flow of air from the pressure side 34 to the suction side 36 at the tip 44 of the main body 38. As the air flows axially rearward from the leading edge 48, the first portion 46, with its relatively small lean angle, presents an impediment to fluid flow and decreases the flow tip momentum transfer from the pressure side 34 to the suction side 36. The momentum transfer decrease, decreases the energy of a vortex formed by the blade 32 towards the incipience of vortex breakdown. The second portion 50, with its larger lean angle, tends to reduce the impediment to fluid flow, allowing a modest increase in flow tip momentum transfer and preventing vortex breakdown from actually occurring. In embodiments where a third and possibly more portions are provided, these may be used to further control the momentum transfer with a view to maintaining the vortex energy at the incipience of breakdown. This may be achieved by carefully selecting the lean angle and/or spanwise length of the additional portion(s).

The maintenance of the vortex at the incipience of breakdown may be particularly advantageous where any vortex is likely to be intercepted by the blades of a downstream rotor (e.g. in the case of contra-rotating rotor rows) or other structures. This is because a low energy vortex may give rise to lower noise levels than a relatively high energy vortex or vortex breakdown when intercepted.

Referring now to FIG. 3, an alternative blade 70 embodiment is shown. The blade 70 is similar to the blade 32, but has a different fence arrangement. A fence 72 of the blade 70 has three portions; a first portion 74, a second portion 76 and a third portion 78. The first portion 74 is nearest a leading edge 80 of the blade 70, with the second portion 76 immediately adjacent the first portion 74 and the third portion 78 immediately adjacent the second portion 76.

The lean angle of the fence 72 increases from the leading edge 80 to a trailing edge 82 of the blade 70. The lean angle of the first 74 and second 76 portions is the same, i.e. approximately 90°. The lean angle of the third portion 78 is approximately 140°. There are no step-wise discontinuities between the portions 74, 76, 78, because second 76 and third 78 portions are provided with complimentary ramp regions 77. Thus the leading edge 80 the lean angle is approximately 90°, while at the trailing edge 82 the lean angle is approximately 140°.

The second portion 76 is shorter than the first 74 and third 78 portions. In the embodiment of FIG. 3, the spanwise length of the first 74 and third 78 portions is approximately 25% of the length of the chord of a main body 84 of the blade 70 at its tip 86. In the embodiment of FIG. 3, the spanwise length of the second portion 76 is approximately 15% of the length of the chord of the main body 84 at its tip 86. In some embodiments the spanwise width of each of the first 74, second 76 and third 78 portions falls between approximately 15% and 25% of the length of the chord of the main body 84 at its tip 86. In the embodiment of FIG. 3, blends 88 are provided to blend the different heights of the different portions 74, 76, 78.

In the embodiment of FIG. 3 the shorter second portion 76 performs a similar function to the second portion 50 of the FIG. 2 embodiment. Specifically, while the second portion 76 continues to present an impediment to the flow from a pressure side 90 to a suction side 92, the impediment is reduced, allowing a modest increase in vortex energy and the avoidance of vortex breakdown. The third portion 78, with restored height and a somewhat increased lean angle, tends to further refine the vortex energy, keeping it proximate incipient vortex breakdown. As will be appreciated, the embodiments of both FIGS. 2 and 3 could be modified to include additional portions with a view to further refining control of vortex energy. Further, for each portion, the spanwise length, chordwise width, lean angle and selection of anhedral or dihedral, as well as other parameters, can be selected to suit a particular application or in order to provide particular vortex energy control in particular operating envelopes.

FIG. 4 shows a further alternative blade 80 which is similar to the blade 70 of FIG. 3. Parts of the blade 80 of FIG. 4 are labelled by reference numerals differing by 10 from reference numerals labelling corresponding parts of the blade 70 in FIG. 3. The blades 70, 80 are identical except that in blade 80 there is discontinuity 87 between second 86 and third 88 portions of fence 82, i.e. the second 86 and third 88 portions of fence 82 do not have complimentary ramp regions.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combina-

The invention claimed is:

1. A fluidfoil comprising:
   a main body; and
   a fence having different lean angles with respect to the main body at different chordwise positions, the fence comprising:
      a first portion that is nearest a leading edge of the fence;
      a second portion that is immediately adjacent the first portion and is spanwise shorter than the first portion; and
      a third portion that is immediately adjacent the second portion and on a chordwise side thereof remote from the first portion,
   wherein the first portion has the same lean angle as the second portion, and the third portion has a greater lean angle than the first and second portions.

2. A fluidfoil according to claim 1, wherein the fence is divided along its chordwise extent such that the third portion is divided from the second portion and there is a step-wise discontinuity between the second and third portions.

3. A fluidfoil according to claim 1, wherein the second and third portions have complimentary ramp regions which meet to smoothly join those portions.

4. A fluidfoil according to claim 1 where the fluidfoil is an open-rotor propeller blade.

5. A gas turbine engine comprising one or more fluidfoils in accordance with claim 1.

6. A gas turbine engine according to claim 5 where the gas turbine engine is an open rotor engine.

7. A method of managing the flow tip momentum transfer from the pressure side to the suction side along the tip of a fluidfoil comprising use of a fluidfoil according to claim 1.

8. A fluidfoil comprising:
   a main body; and
   a fence having different lean angles with respect to the main body at different chordwise positions,
   wherein the fence is divided along its chordwise extent into at least two portions, where a first portion nearer a leading edge of the fence has a smaller lean angle than a second portion further from the leading edge, the first and second portions are immediately adjacent and integral with each other, and all portions of the fence are anhedral.

* * * * *